United States Patent
Moreman et al.

(10) Patent No.: US 8,572,283 B2
(45) Date of Patent: Oct. 29, 2013

(54) SELECTIVELY APPLYING NETWORK ADDRESS PORT TRANSLATION TO DATA TRAFFIC THROUGH A GATEWAY IN A COMMUNICATIONS NETWORK

(75) Inventors: Charles Moreman, Grayson, GA (US); William Francis Siadak, Suwanee, GA (US)

(73) Assignee: Cisco Technology, Inc., San Jose, CA (US)

( * ) Notice: Subject to any disclaimer, the term of this patent is extended or adjusted under 35 U.S.C. 154(b) by 185 days.

(21) Appl. No.: 13/180,205

(22) Filed: Jul. 11, 2011

(65) Prior Publication Data

US 2012/0011275 A1 Jan. 12, 2012

Related U.S. Application Data

(60) Provisional application No. 61/363,504, filed on Jul. 12, 2010.

(51) Int. Cl.
*G06F 15/16* (2006.01)
*H04L 12/28* (2006.01)
*H04L 12/56* (2011.01)

(52) U.S. Cl.
USPC ........... 709/238; 370/401; 709/227; 709/228; 709/229

(58) Field of Classification Search
USPC ................. 370/235, 252, 386, 389, 401, 467; 709/227, 229, 238
See application file for complete search history.

(56) References Cited

U.S. PATENT DOCUMENTS

| 6,243,754 | B1 * | 6/2001 | Guerin et al. | 709/227 |
|---|---|---|---|---|
| 7,512,138 | B2 * | 3/2009 | Horoschak et al. | 370/401 |
| 2002/0172197 | A1 * | 11/2002 | Dale et al. | 370/386 |
| 2006/0114835 | A1 * | 6/2006 | Horoschak et al. | 370/252 |
| 2006/0126613 | A1 * | 6/2006 | Zweig | 370/389 |
| 2008/0069106 | A1 * | 3/2008 | Tokumoto et al. | 370/392 |
| 2009/0245278 | A1 * | 10/2009 | Kee | 370/467 |
| 2011/0182182 | A1 * | 7/2011 | Yang et al. | 370/235 |

* cited by examiner

*Primary Examiner* — Quang N Nguyen
*Assistant Examiner* — Raji Krishnan
(74) *Attorney, Agent, or Firm* — Merchant & Gould (57) ABSTRACT

Network Address Port Translation (NAPT) may be selectively applied to data traffic through a gateway in a communications network. The data traffic may be received at a primary gateway in the communications network. The primary gateway may then analyze the received data traffic to determine a network path. The primary gateway may then determine whether to apply NAPT to the received data traffic based on whether the network path terminates at a first service provider network or a second service provider network. The primary gateway may apply NAPT on the received data traffic upon determining that the network path terminates at the first service provider network or bridge the received data traffic to a secondary gateway upon determining that the network path terminates at the second service provider network.

20 Claims, 5 Drawing Sheets

SELECTIVELY APPLYING NETWORK ADDRESS PORT TRANSLATION TO DATA TRAFFIC THROUGH A GATEWAY IN A COMMUNICATIONS NETWORK

CROSS-REFERENCE TO RELATED APPLICATIONS

This utility application claims the benefit under 35 U.S.C. §119(e) of U.S. Provisional Patent Application No. 61/363,504 filed on Jul. 12, 2010, which is hereby incorporated by reference in its entirety.

BACKGROUND

With the advent of modern communications networks, a single client device may be capable of receiving multiple network services from different service providers. For example, a client computer may receive Internet access from one service provider via a first internet protocol ("IP") connection to a wide area network (such as the Internet) and television service from a second service provider via a second IP connection to the same wide area network. In order to enable the aforementioned dual functionality, typically, two gateways are "daisy-chained" together (i.e., connected in series). Each of the connected gateways are configured to provide Network Address Port Translation ("NAPT") which is required for communicating data between the client device and one of the different service providers. However, the aforementioned typical configuration suffers from a number of drawbacks. One drawback is that the first gateway in the series is configured to apply NAPT to all incoming traffic regardless of its destination. For example, a typical configuration may include a client computer, in communication with daisy-chained gateways A and B, which sends different types of data traffic to an unmanaged data service provider A and a managed data service provider B through the gateways. Gateway A may be associated with and provide NAPT for the unmanaged data service provider A while gateway B may be associated with and provide NAPT for the managed data service provider B. However, since gateway A applies NAPT to all incoming data traffic, regardless of its destination, data traffic which is destined for the managed service provider B would have NAPT applied twice, once by gateway A and once by gateway B. One result of this double layer of NAPT is that some applications (i.e., data) are blocked from reaching the appropriate service provider. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for selectively applying Network Address Port Translation ("NAPT") to data traffic through a gateway in a communications network. A primary gateway in the communications network may receive the data traffic. The primary gateway may then analyze the received data traffic to determine a network path. The primary gateway may then determine whether to apply NAPT to the received data traffic based on whether the network path terminates at a first service provider network or a second service provider network. The primary gateway may apply NAPT on the received data traffic upon determining that the network path terminates at the first service provider network or bridge the received data traffic to a secondary gateway upon determining that the network path terminates at the second service provider network.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for selectively applying Network Address Port Translation ("NAPT") to data traffic through a gateway in a communications network. A primary gateway in the communications network may receive the data traffic. The primary gateway may then analyze the received data traffic to determine a network path. The primary gateway may then determine whether to apply NAPT to the received data traffic based on whether the network path terminates at a first service provider network or a second service provider network. The primary gateway may apply NAPT on the received data traffic upon determining that the network path terminates at the first service provider network or bridge the received data traffic to a secondary gateway upon determining that the network path terminates at the second service provider network.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
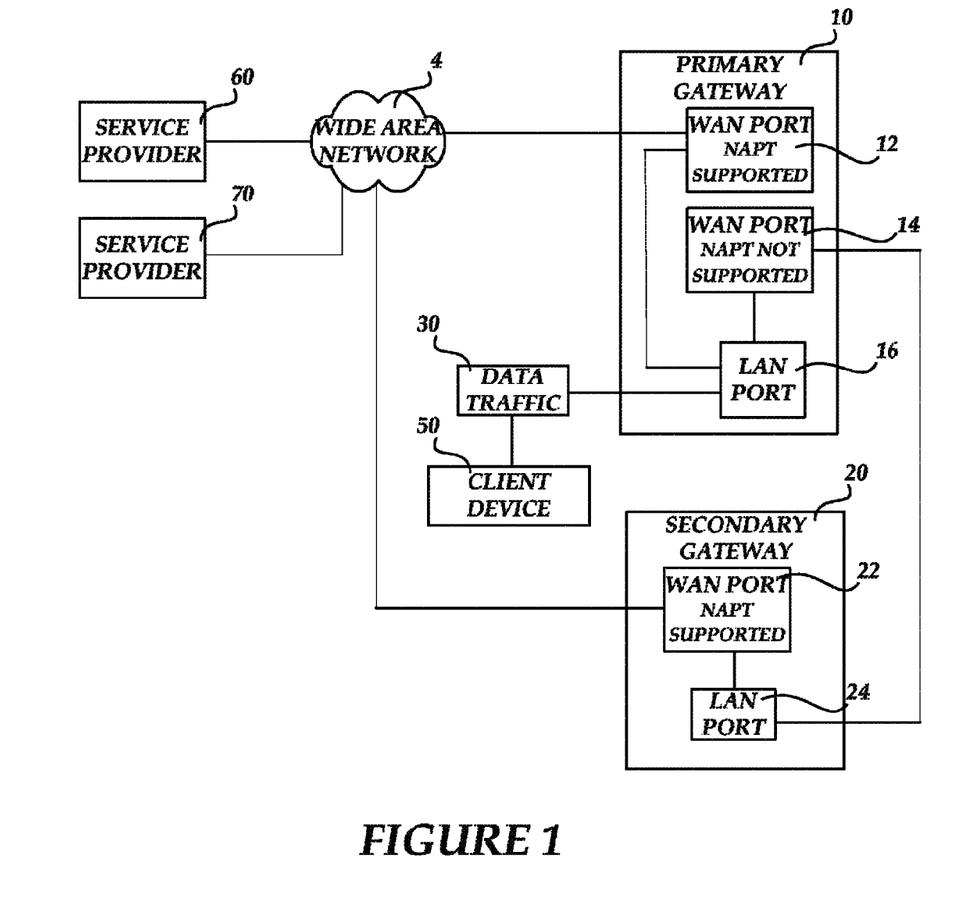
FIG. 1 is a block diagram illustrating a network architecture for selectively applying Network Address Port Translation ("NAPT") to data traffic through a gateway in a communications network, in accordance with an embodiment.

Referring now to the drawings, in which like numerals represent like elements through the several figures, various aspects of the present invention will be described. FIG. 1 is a block diagram illustrating a network architecture for selectively applying NAPT to data traffic through a gateway in a communications network, in accordance with an embodiment. The network architecture includes a client device 50 which communicates data traffic 30 with a primary gateway 10. The data traffic 30 may comprise both managed data traffic (e.g., video over Internet Protocol ("IP") data packets) and unmanaged data traffic (e.g., public Internet data or "Web" traffic). The client device 50 may comprise a general purpose desktop, laptop, handheld, tablet, or other type of computer capable of executing one or more applications, including, without limitation, a video application and an Internet web browser application.

The primary gateway 10 is in communication with a secondary gateway 20 and a service provider 60 over a wide area network ("WAN") 4, such as the Internet. In accordance with an embodiment, and as described in greater detail herein, the primary gateway may be configured to selectively applying NAPT to managed data traffic. The primary gateway 10 may comprise a residential gateway or dynamic host configuration protocol ("DHCP") server which is utilized to automatically configure a computer (such as the client device 50) for communication with other computers connected to an IP network. DHCP servers also provide a central database for keeping track of computers that have been connected to a network thereby preventing two or more computers from accidentally being configured with the same IP address. The primary gateway 10 may include a WAN port 12, a WAN port 14 and a local area network ("LAN") port 16. In accordance with an embodiment, the LAN port 16 may be configured to receive managed data traffic from the client device 50. It should be understood that the primary gateway 10 may further include additional LAN ports (not shown) for establishing communication connections with additional client devices without departing from the spirit and scope of the various embodiments described herein. The WAN port 12 may be configured to support NAPT with respect to the managed data traffic destined for the service provider 60. Conversely, the WAN port 14 may be configured to not support NAPT and may further be utilized to bridge unmanaged data traffic between the primary gateway 10 and the secondary gateway 20.

As should be understood by those skilled in the art, NAPT is a method by which many network addresses and their TCP/UDP (Transmission Control Protocol/User Datagram Protocol) ports are translated into a single network address and its TCP/UDP ports. NAPT modifies both the IP address and the transport identifier (for example, the TCP or UDP port number, or the internet control message protocol ("ICMP") query identifier) and places the mapping into a translation table (this entry is called an "extended" translation). NAPT can translate the addresses and transport identifiers of many private hosts into a few external addresses and transport identifiers to make efficient use of globally registered IP addresses. For outbound packets, NAPT translates the source IP address, source transport identifier, and related checksum fields and for inbound packets, NAPT translates the destination IP address, destination transport identifier, and checksum fields. NAPT is defined in section 2.2 of Request for Comment ("RFC") 3022.

In accordance with an embodiment, the secondary gateway 20 may be in communication with a service provider 70 over the WAN 4. The secondary gateway 20 may include a WAN port 22 and LAN port 24. In accordance with an embodiment, the LAN port 24 may be configured to receive unmanaged data traffic destined for the service provider 70, from the WAN port 14 in the primary gateway 10. As will be described in greater detail herein, the secondary gateway 20 may be utilized to apply NAPT to unmanaged data traffic destined for the service provider 70 at the WAN port 22. It should be understood that the secondary gateway 20 may also include additional LAN ports (not shown) for establishing communication connections with additional client devices without departing from the spirit and scope of the various embodiments described herein.

As briefly discussed above, the data traffic 30 may comprise both managed data traffic and unmanaged data traffic. In accordance with various embodiments, managed data traffic may further various types of IP data traffic including, but not limited to, video over voice over IP data packets and/or other types of data which are utilized to support various services and applications provided by multiple service providers. The aforementioned services and applications may include those that utilize UDP transport (for voice, video and other services) and/or Universal Plug and Play ("UPnP") Internet Gateway Device ("IGD") protocols (for controlling gateway firewall instances and configuring gateway NAPT traversal). For example, in accordance with an embodiment, the data traffic 30 may comprise managed data traffic which includes video over IP data packets destined for a video service provided by a cable television service provider (e.g., the service provider 60). Alternatively, the data traffic 30 may comprise unmanaged data traffic which includes public Internet data packets destined for a data service provided by an Internet service provider (e.g., the service provider 70).

Figure 2:
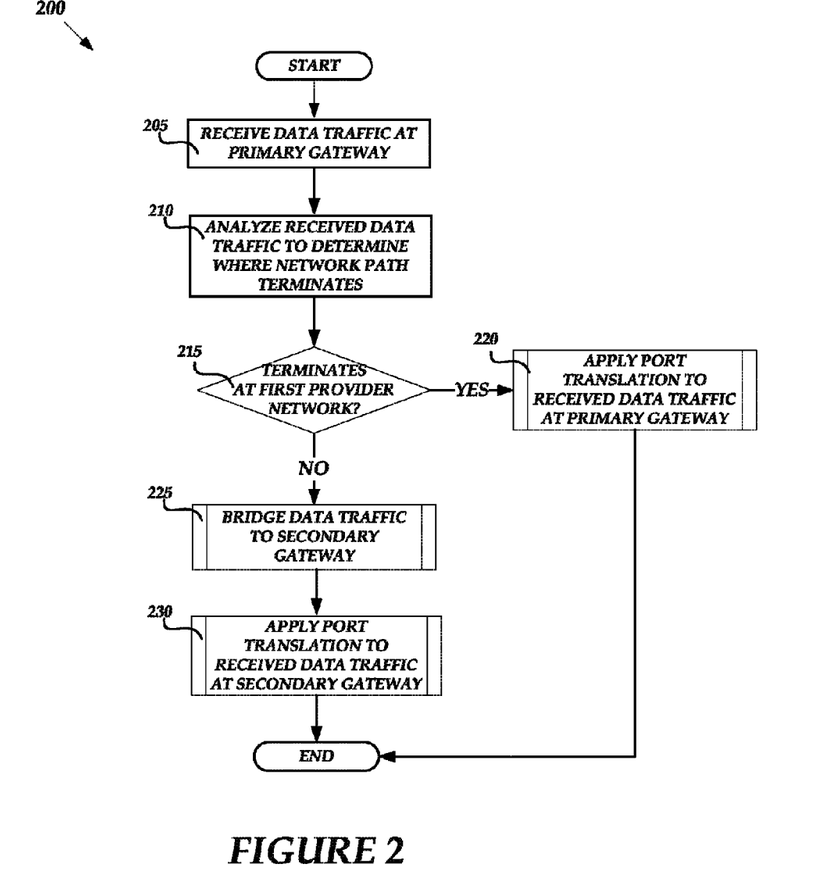
FIG. 2 is a flow diagram illustrating a routine for selectively applying NAPT to data traffic through a gateway in a communications network, in accordance an embodiment.

FIG. 2 is a flow diagram illustrating a routine 200 for selectively applying NAPT to data traffic through a gateway in a communications network, in accordance an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 2-5 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 200 begins at operation 205 where the primary gateway 10 receives the data traffic 30. In particular, the primary gateway 10 may receive the data traffic 30 at the LAN port 16 from the client device 50.

From operation 205, the routine 200 continues to operation 210 where the primary gateway 10 analyzes traffic 30 to determine a network path. In particular, the primary gateway 10 may be configured to execute instructions to analyze the data traffic 30 for a network configuration, established at the client device 50, for routing the data traffic 30 to either the service provider 60 or the service provider 70. For example, in accordance with an embodiment, the primary gateway 10 may be to analyze one or more destination packets within the data traffic 30 configured by the client device 50. The configuration of the destination packets may indicate that the data traffic 30 is managed data traffic (and thus destined for the service provider 60) or that the data traffic 30 is unmanaged data or Web traffic (and thus destined for the service provider 70).

From operation 210, the routine 200 continues to operation 215 where the primary gateway 10 determines whether or not to apply NAPT to the data traffic 30 based on the analysis performed at operation 205. That is, the primary gateway 10 may be configured to determine whether to apply NAPT based on whether the network path for the data traffic 30 terminates at the service provider 60 or whether to bridge the data traffic 30 based on whether the data traffic 30 terminates at the service provider 70. If, at operation 215, the primary gateway 10 determines that the network path for the data traffic 30 terminates at the service provider 60, then the routine 200 continues to operation 220. If, at operation 215, the primary gateway 10 determines that the network path for the data traffic 30 terminates at the service provider 70, then the routine 200 branches to operation 225.

At operation 220, the primary gateway 10, upon determining that the network path for the data traffic 30 terminates at the service provider 60, applies NAPT to the data traffic 30. An illustrative routine 300 describing the application of NAPT at the primary gateway 10 will be described in greater detail below. From operation 220, the routine 200 then ends.

At operation 225, the primary gateway 10, upon determining that the network path for the data traffic 30 terminates at the service provider 70, bridges the data traffic 30 to the secondary gateway 20. An illustrative routine 400 describing the bridging of the data traffic 30 will be described in greater detail below.

From operation 225, the routine 200 continues to operation 230 where the secondary gateway 20 applies NAPT to the data traffic 30. An illustrative routine 500 describing the application of NAPT at the secondary gateway 20 will be described in greater detail below. From operation 230, the routine 200 then ends.

Figure 3:
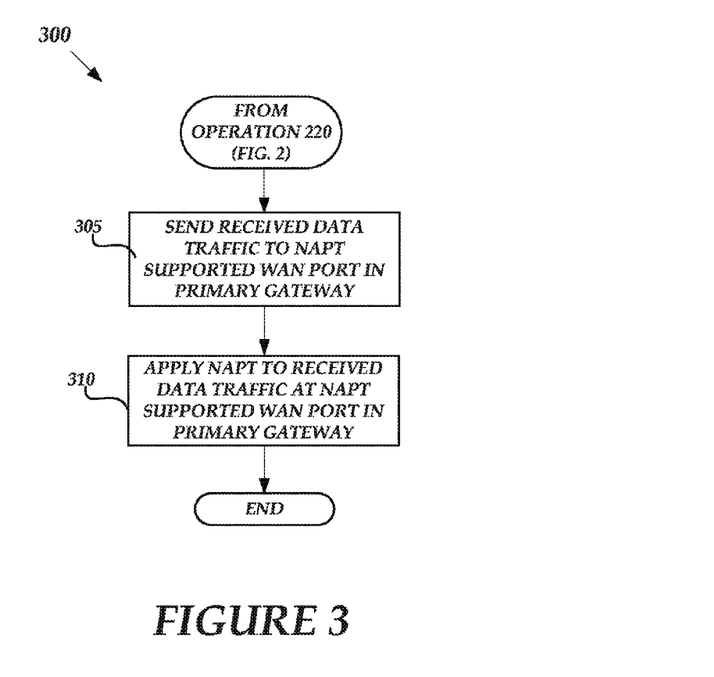
FIG. 3 is a flow diagram illustrating a routine for applying NAPT at a primary gateway in a communications network, in accordance an embodiment.

FIG. 3 is a flow diagram illustrating a routine 300 for applying NAPT at a primary gateway in a communications network, in accordance an embodiment. The routine 300 begins from operation 220 of FIG. 2 and continues to operation 305 where the primary gateway 10 sends the data traffic 30, previously determined to be destined for the service provider 60, from the LAN port 16, to the WAN port 12. As discussed above with respect to FIG. 1, the WAN port 12 is configured to support NAPT for the service provider 60.

From operation 305, the routine continues to operation 310 where the primary gateway 10 applies NAPT to the data traffic 30 at the WAN port 12. From operation 310, the routine 300 then ends.

Figure 4:
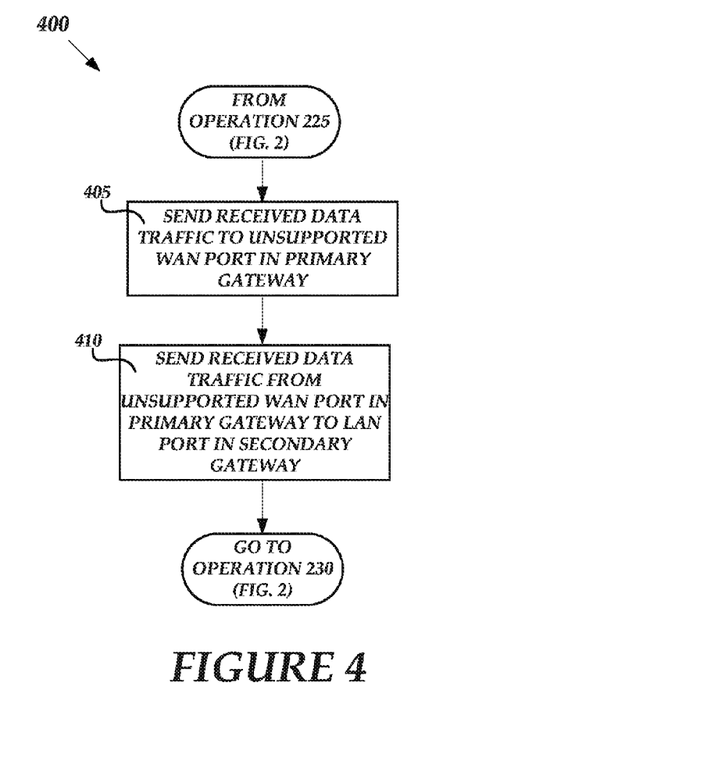
FIG. 4 is a flow diagram illustrating a routine for bridging data traffic from a primary gateway to a secondary gateway in a communications network, in accordance an embodiment.

FIG. 4 is a flow diagram illustrating a routine 400 for bridging data traffic from a primary gateway to a secondary gateway in a communications network, in accordance an embodiment. The routine 400 begins from operation 225 of FIG. 2 and continues to operation 405 where the primary gateway 10 sends the data traffic 30, previously determined to be destined for the service provider 70, from the LAN port 16 to the WAN port 14. As discussed above with respect to FIG. 1, the WAN port 14 is not configured to support NAPT.

From operation 405, the routine continues to operation 410 where the primary gateway 10 sends the data traffic 30 from the WAN port 14 to the LAN port 24 in the secondary gateway 20. From operation 405, the routine 400 then branches to operation 230 of FIG. 2.

Figure 5:
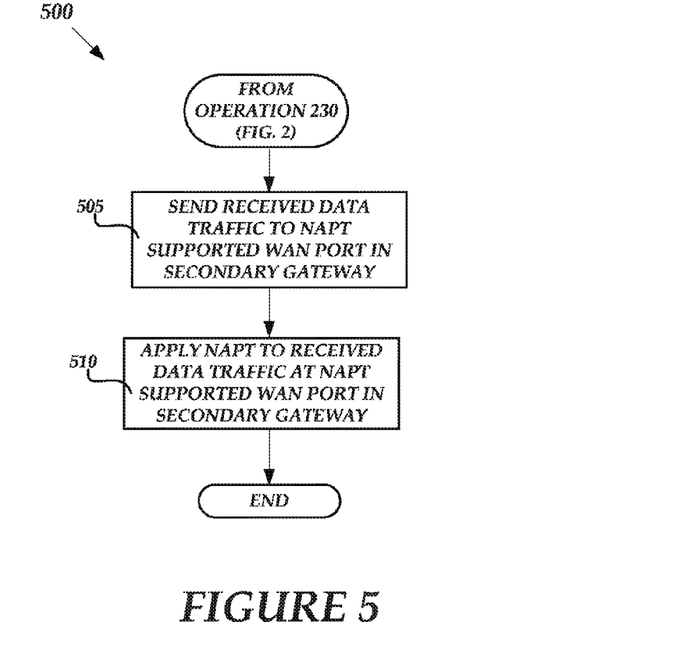
FIG. 5 is a flow diagram illustrating a routine for applying NAPT at a secondary gateway in a communications network, in accordance an embodiment.

FIG. 5 is a flow diagram illustrating a routine 500 for applying NAPT at a secondary gateway in a communications network, in accordance an embodiment. The routine 500 begins from operation 230 (FIG. 2) and continues to operation 505 where the secondary gateway 20 sends the data traffic 30, received from the WAN port 14 in the primary gateway 10, from the LAN port 24 to the WAN port 22. As discussed above with respect to FIG. 1, the WAN port 22 is configured to support NAPT for the service provider 70.

From operation 505, the routine continues to operation 510 where the secondary gateway 20 applies NAPT to the data traffic 30 at the WAN port 24. From operation 510, the routine 500 then ends.

Although the invention has been described in connection with various illustrative embodiments, those of ordinary skill in the art will understand that many modifications can be made thereto within the scope of the claims that follow. For example, the networked environment of FIG. 1 may contain more than the two different service providers shown therein. In particular, various embodiments may support multiple service providers each supporting a different IP services and/or applications. In these embodiments, the primary gateway 10 and the secondary gateway 20 may be configured with additional WAN ports to support NAPT for the additional IP services and/or applications. Accordingly, it is not intended that the scope of the invention in any way be limited by the above description, but instead be determined entirely by reference to the claims that follow.

What is claimed is:

1. A method of selectively applying Network Address Port Translation (NAPT) to data traffic in a communications network, comprising:
   receiving the data traffic at a primary gateway, wherein the primary gateway comprises a first WAN port configured to support NAPT, and a second WAN port configured to not support the NAPT;
   analyzing the received data traffic to determine a network path;
   determining whether to apply the NAPT to the received data traffic at the primary gateway based on whether the network path terminates at a first service provider network;
   determining, at the primary gateway, whether to bridge the received data traffic to a secondary gateway based on whether the network path terminates at a second service provider network, wherein bridging comprises sending the data traffic to the second WAN port of the primary gateway; and
   applying the NAPT at the primary gateway upon determining that the network path for the received data traffic terminates at the first service provider network, wherein applying NAPT comprises sending the data traffic to the first WAN port.

2. The method of claim 1, wherein bridging the data traffic to the secondary gateway further comprises applying the NAPT at the secondary gateway.

3. The method of claim 1, wherein receiving data traffic at a primary gateway comprises receiving at least one of managed data traffic and unmanaged data traffic at the primary gateway.

4. The method of claim 1, wherein receiving data traffic at a primary gateway comprises receiving the data traffic at a local area network (LAN) port in the primary gateway, the data traffic being received from a client device in communication with the primary gateway.

5. The method of claim 1, wherein analyzing the received data traffic to determine a network path comprises analyzing the received data traffic for a network configuration established at the client device for routing the data traffic to at least one of the first network service provider and the second network service provider.

6. The method of claim 1, wherein applying the NAPT at the primary gateway further comprises:
   applying the NAPT to the data traffic at the first WAN port in the primary gateway.

7. The method of claim 1, wherein bridging the data traffic to a secondary gateway comprises:
   sending the data traffic from a LAN port in the primary gateway to the second WAN port in the primary gateway; and
   sending the data traffic from the second WAN port in the primary gateway to a LAN port in the secondary gateway.

8. The method of claim 7, further comprising:
   sending the data traffic from the LAN port in the secondary gateway to a supported WAN port in the secondary gateway, the supported WAN port in the secondary gateway being configured for the NAPT; and
   applying the NAPT to the data traffic at the supported WAN port in the secondary gateway.

9. A system of selectively applying Network Address Port Translation (NAPT) to data traffic in a communications network, comprising:
   a primary gateway comprising at least a first wide area network (WAN) port and a second WAN port, the primary gateway being operative to:
      receive data traffic from a client device;
      analyze the received data traffic to determine a network path;
      determine whether to apply the NAPT to the received data traffic based on whether the network path terminates at a first service provider network;
      determine whether to bridge the received data traffic to a secondary gateway based on whether the network path terminates at a second service provider network, wherein bridging comprises sending the data traffic to the second WAN port, the second WAN port configured not to support the NAPT;
      apply the NAPT upon determining that the network path for the received data traffic terminates at the first service provider network, wherein applying the NAPT comprises sending the data traffic to the first WAN port, the first WAN configured to support NAPT; and
   the secondary gateway comprising a third WAN port, the secondary gateway being in communication with the primary gateway and operative to:
      receive the data traffic from the primary gateway upon a determination, by the primary gateway, that the network path for the received data traffic terminates at the second service provider network; and
      apply the NAPT to the received data traffic from the primary gateway.

10. The system of claim 9, wherein the received data traffic comprises at least one of managed data traffic and unmanaged data traffic at the primary gateway.

11. The system of claim 9, wherein the primary gateway further comprises:
   a first local area network (LAN) port for receiving the data traffic from the client device.

12. The system of claim 9, wherein the primary gateway, in analyzing the received data traffic to determine a network path, is further operative to analyze the received data traffic for a network configuration established at the client device for routing the data traffic to at least one of the first network service provider and the second network service provider.

13. The system of claim 9, wherein the primary gateway, in applying the NAPT upon determining that the network path for the received data traffic terminates at the first service provider network, is further operative to:
   receive the data traffic at the first WAN port in the primary gateway; and
   apply the NAPT to the data traffic at the first WAN port.

14. The system of claim 9, wherein the secondary gateway further comprises:
   a second LAN port for receiving the data traffic from the primary gateway; and
   wherein the third WAN port is configured to support the NAPT.

15. The system of claim 14, wherein the secondary gateway, in receiving the data traffic from the primary gateway upon a determination, by the primary gateway, that the network path for the received data traffic terminates at the second service provider network, is further operative to receive the data traffic at the second LAN port from the second WAN port in the primary gateway.

16. The system of claim 15, wherein the secondary gateway, in applying the NAPT to the received data traffic from the primary gateway, is operative to:
   send the data traffic from the second LAN port to the third WAN port; and
   apply the NAPT to the data traffic at the third WAN port.

17. The system of claim 9, wherein the primary gateway comprises a Dynamic Host Configuration Protocol (DHCP) server.

18. A method of selectively applying Network Address Port Translation (NAPT) to data traffic in a communications network, comprising:
   receiving the data traffic at a local area network (LAN) port in a primary gateway, the data traffic being received from a client device in communication with the primary gateway;
   analyzing the received data traffic to determine a network path, wherein determining the network path comprises analyzing for a network configuration established at the client device for routing the data traffic to at least one of a first network service provider and a second network service provider, the first network service provider providing a managed data service and the second network service provider providing an unmanaged data service;
   determining whether to apply the NAPT to the received data traffic at the primary gateway based on whether the network path terminates at the first service provider network;
   determining, at the primary gateway, whether to bridge the received data traffic to a secondary gateway based on whether the network path terminates at the second service provider network;
   applying the NAPT at the primary gateway upon determining that the network path for the received data traffic terminates at the first service provider network, wherein applying the NAPT comprises sending the data traffic to a first wide area network (WAN) port of the primary gateway, wherein the first WAN port is configured to support the NAPT; and
   bridging the data traffic to a secondary gateway upon determining that the network path for the received data traffic terminates at the second service provider network, wherein bridging comprises sending the data traffic to a second WAN port of the primary gateway, wherein the second WAN port is configured not to support the NAPT.

19. The method of claim 18, wherein applying the NAPT at the primary gateway upon determining that the network path for the received data traffic terminates at the first service provider network further comprises:
   applying the NAPT to the data traffic at the first WAN port in the primary gateway.

20. The method of claim 18, wherein bridging the data traffic to a secondary gateway upon determining that the network path for the received data traffic terminates at the second service provider network comprises:
- sending the data traffic from the second WAN port in the primary gateway to a LAN port in the secondary gateway;
- sending the data traffic from the LAN port in the secondary gateway to a WAN port in the secondary gateway, the WAN port in the secondary gateway being configured for supporting the NAPT; and
- applying the NAPT at the secondary gateway.

* * * * *